C. F. WASSERFALLEN.
SPARE TIRE CARRIER.
APPLICATION FILED OCT. 30, 1915.

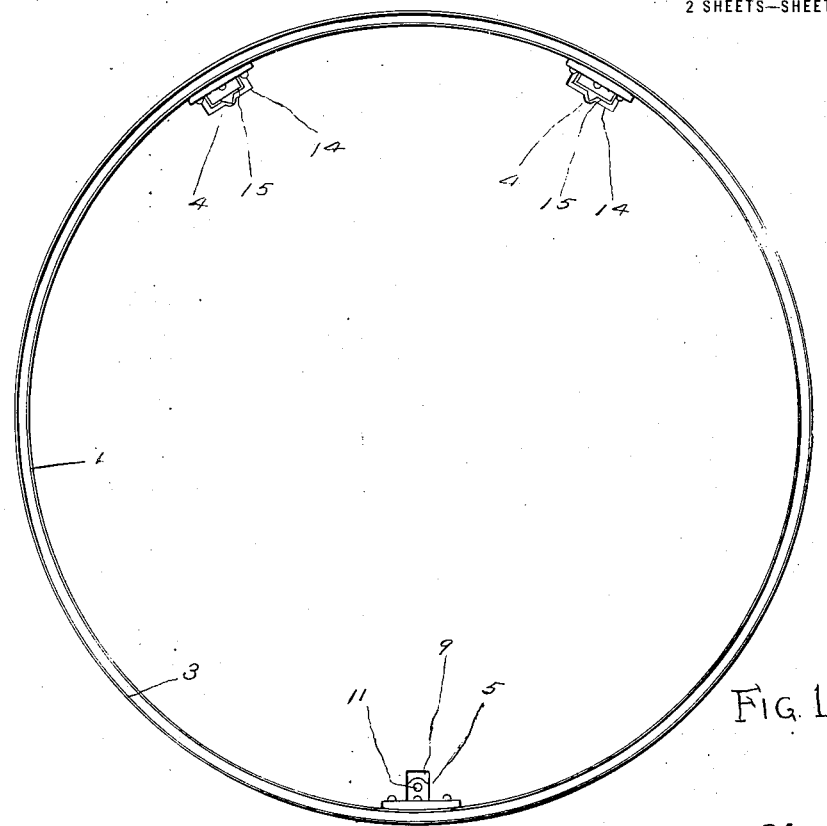
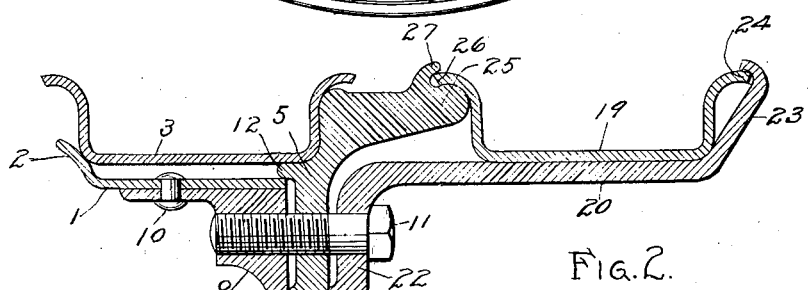
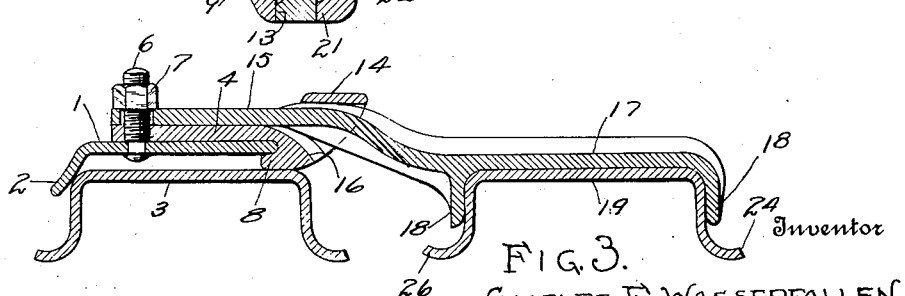

1,279,801.

Patented Sept. 24, 1918.
2 SHEETS—SHEET 2.

Inventor
CHARLES F. WASSERFALLEN

Witnesses

UNITED STATES PATENT OFFICE.

CHARLES F. WASSERFALLEN, OF DETROIT, MICHIGAN, ASSIGNOR, BY MESNE ASSIGNMENTS, TO DETROIT TIRE CARRIER CO., OF DETROIT, MICHIGAN, A CORPORATION OF MICHIGAN.

SPARE-TIRE CARRIER.

1,279,801.  Specification of Letters Patent.  Patented Sept. 24, 1918.

Application filed October 30, 1915. Serial No. 58,740.

*To all whom it may concern:*

Be it known that I, CHARLES F. WASSERFALLEN, a citizen of the United States of America, residing at Detroit, in the county of Wayne and State of Michigan, have invented certain new and useful Improvements in Spare-Tire Carriers, of which the following is a specification, reference being had therein to the accompanying drawings.

In equipping automobiles for touring or long trips that carry them some distance from supplies, it is customary to carry two or more spare tires on suitable fittings. Such a fitting when it does not have a full quota of tires thereon, presents unoccupied portions that project from the body of the car and are unsightly and generally in the way.

This invention relates to a tire carrier whereby additional tires may be readily transported by means that are quickly manipulated to permit the withdrawal or replacement of such means that may be dismounted when the carrier has the minimum load, so that the carrier presents no unnecessary projecting parts.

The invention consists in the matters hereinafter set forth, and more particularly pointed out in the appended claims.

Referring to the drawings,

Figure 1 is a plan view of a tire carrier that embodies features of the invention;

Fig. 2 is a view in longitudinal section, showing a double clamp support in assembled position;

Fig. 3 is a view in longitudinal section showing a double bracket in assembled position;

Figure 4:
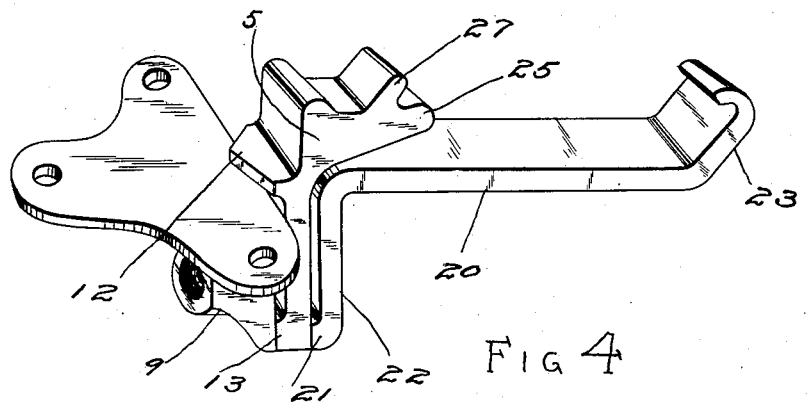
Fig. 4 is a view in perspective and in detail of the assembled clamp with the carrier rim omitted.
Figure 5:
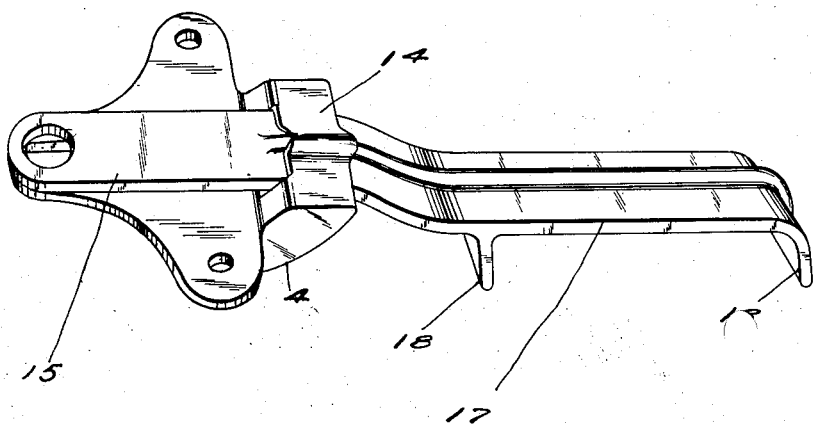
Fig. 5 is a view in perspective, and in detail of the double carrier bracket with the rim omitted.

As shown in the drawings, a carrier ring 1 has a marginal flange 2, against which a spare tire rim, such as indicated at 3, may be mounted and clamped by coöperating members 4 and 5 of which two of the former and one of the latter, or vice versa, are sufficient although more may be used. The carrier ring 1 itself is of course supported on the car body by appropriate means, not shown, which vary with the design of the body and with the point of application of the carrier thereto.

A screwthreaded stud 6 and nut 7 are adapted to hold the member 4, which has an undercut flange 8 overlying the plane margin of the annulus 1, wedged under the body of the applied tire rim 3. A holding block 9 that is suitably secured as by a rivet 10 to the annulus 1, has screwthreaded engagement with a cap screw 11 whereby a lip 12 of the member 5 that acts as a wedge, may be forced between the applied rim 3 and the annulus 1, the member 5 rocking on a fulcrum lug 13 that bears against the block 9. The member 5 is furthermore shaped as indicated to conform to the annular face of the applied rim 3.

By this means a tire rim may be carried as part of the regular equipment without any unsightly obtruding brackets or projections, the members 4 and 5 extending only slightly beyond the plane of the applied tire and rim.

A slight extension 14 of the member 4 has an opening through which the shank portion 15 of an auxiliary bracket may be thrust, the inner portion of the shank being apertured to slip over the stud 6, the opening of the extension 14 being flared as indicated at 16 to provide for sufficient movement or rocking of the shank 15 to permit this application to the stud. When the nut 7 is turned home, the auxiliary bracket is seated firmly in place, the meeting faces of the parts conforming closely.

The body 17 of the auxiliary bracket has a pair of coöperating lugs 18 whereby a spare tire rim, such as indicated at 19, is readily mounted and is clamped in position by auxiliary clamps 20 each having a fulcrum projection 21 that bears against the companion main clamp 5 when a depending apertured arm 22 of the auxiliary clamp is forced home by the cap screw 11 which is long enough to receive this arm. When so engaged, an outer arm 23 of the bracket or clamp 20 overlies and secures the outer bead 24 of the rim 19 while an extension 25 of the clamp 5 bears against the corresponding inner bead 26 of the applied rim 19, a hook portion or finger 27 engaging over the margin of said contiguous rim flange to further guard against displacement.

A tire carrier is thus provided for the regular spare tire, such as is customarily carried in the city or on a short trip, while the auxiliary parts are dismounted and in the tool box or other place. There are no unsightly projections or other elements which are in the way or which are detrimental to the car's appearance. For touring, the auxiliary parts are quickly applied and when so placed effectively lock a second spare tire rim in concentric relation with the first. The carrier may, of course, be adapted to carry two or more tires, regularly, with the auxiliary attachment for other auxiliary tires.

Obviously, changes in the details of construction may be made without departing from the spirit of my invention and I do not care to limit myself to any particular form or arrangement of parts.

What I claim is:—

1. A tire carrier comprising coöperating rim clamping members adapted to detachably engage and support a spare tire and auxiliary coöperating clamping members adapted to be mounted on the main members and to support an extra tire rim.

2. A tire carrier comprising coöperating clamping members for supporting a spare tire and auxiliary clamping members supported by and coöperating with the regular members on which they are detachably secured, to carry a spare tire.

3. A tire carrier comprising a spacing member, regular clamping members permanently mounted thereon for carrying a tire, and auxiliary tire carrying members adapted to be detachably secured to the carrier structure for a spare tire support.

4. A tire carrier comprising a spacing member, tire supporting and clamping means permanently mounted thereon, and auxiliary tire supporting and carrying means adapted to be detachably engaged and supported by the regular clamping members and to coöperate therewith to secure applied tires.

5. A tire carrier comprising a spacing member, coöperating clamping members and brackets mounted thereon, means for securing the clamps and brackets to coöperate with the spacing member in supporting an applied tire, and auxiliary clamps and brackets detachably mounted on the structure and adapted to coöperate with the regular clamps and brackets to support an applied tire.

6. A tire carrier comprising an annulus having a marginal rim flange, clamps and brackets engaging the plain rim of the annulus, means for forcing the clamps and brackets into engagement with a tire rim applied to the annulus rim flange, and auxiliary clamps and brackets detachably mounted on the regular clamps and brackets and adapted to coöperate therewith in supporting a spare tire rim, the regular securing means also holding the auxiliary clamps and brackets in position when the latter are applied.

7. A tire carrier having a marginally flanged ring, members on the ring adapted to hook over the plain lip margin of the ring and to be forced between the surface of the ring and an applied tire, means for securing these members in adjusted position, brackets on the ring adapted to coöperate with the flanged margin thereof and with the other members to hook over and wedge an applied tire rim in place, means for securing the wedging members, auxiliary clamps adapted to detachably engage on the regular clamps and secured by the regular clamp holding means, and auxiliary brackets adapted to be detachably engaged on and supported by the regular brackets and to be secured by the regular bracket holding means.

In testimony whereof I affix my signature in presence of two witnesses.

CHARLES F. WASSERFALLEN.

Witnesses:
ANNA M. DORR,
C. R. STICKNEY.